(12) United States Patent
Gong et al.

(10) Patent No.: US 8,327,324 B1
(45) Date of Patent: Dec. 4, 2012

(54) MESSAGE LOGGING SYSTEM

(75) Inventors: Changbin Gong, Shrewsbury, MA (US);
Rulian W. Fiske, Hopedale, MA (US);
Fernando Oliveira, Sudbury, MA (US);
Yu Teng, Shanghai (CN); Rui Tang,
Shanghai (CN)

(73) Assignee: EMC Corporation, Hopkinton, MA (US)

( * ) Notice: Subject to any disclaimer, the term of this patent is extended or adjusted under 35 U.S.C. 154(b) by 1101 days.

(21) Appl. No.: 12/286,296

(22) Filed: Sep. 29, 2008

(51) Int. Cl.
*G06F 9/44* (2006.01)
(52) U.S. Cl. ........................................................ 717/110
(58) Field of Classification Search ........................ None
See application file for complete search history.

(56) References Cited

U.S. PATENT DOCUMENTS

| | | | |
|---|---|---|---|
| 2002/0129335 A1* | 9/2002 | Lewis ........................... | 717/124 |
| 2003/0204785 A1* | 10/2003 | Kinderman et al. ............ | 714/43 |
| 2009/0007065 A1* | 1/2009 | Becker ........................... | 717/110 |
| 2010/0036801 A1* | 2/2010 | Pirvali et al. ...................... | 707/2 |
| 2010/0128866 A1* | 5/2010 | Irun-Briz et al. ........ | 379/265.02 |

OTHER PUBLICATIONS

Mark Lewis, Executive Vice President, Chief Development Officer, EMC Corporation, "Innovation +", Keynote Address, Red Herring East, Jun. 28, 2007, 19 pp.

* cited by examiner

*Primary Examiner* — Philip Wang
(74) *Attorney, Agent, or Firm* — Muirhead and Saturnelli, LLC (57) ABSTRACT

Logging messages includes providing a logging subsystem that performs logging tasks, providing a log message database that contains log messages that are accessed according to a token value and providing calls to the logging subsystem, where a preprocessor modifies source code to replaces in-line text string parameters with tokens corresponding to the text string parameters. The in-line text string parameters may be log messages. The log message database may be coupled to the logging subsystem and the logging subsystem may access the log messages using the tokens. The preprocessor may determine if an in-line text message already exists in the log message database and, if not, may create a new entry for the in-line text message in the log message database.

20 Claims, 5 Drawing Sheets

MESSAGE LOGGING SYSTEM

BACKGROUND OF THE INVENTION

1. Technical Field

This application relates to the field of logging messages, and more particularly to the field of providing and combining different techniques for logging messages.

2. Description of Related Art

Message logging in software may be used for a number of purposes, including software development. A developer may insert in source code calls to a logging function to cause an appropriate message to be saved in a log file (or possibly displayed on a screen), thus facilitating error detection and the monitoring of intermediate values of variables. For example, the developer may test if an index variable exceeds the number of elements in a table and may insert a call to log a message indicating the condition. The code may be something like:

If (index_variable>NUMELEMENTS) then
call log routine to indicate index out-of-bounds condition In some cases, message logging may be used in production code provided to end users. If the user experiences a problem with the code, it may be possible to examine the log file to determine, for example, whether the problem is due to code errors or to a user mistake. Of course, for production code, the number and type of messages that are logged may be different than that used for code under development.

Software may be developed in a standardized manner to be placed on a processing appliance, such as the Common Appliance Platform (CAP) provided by EMC Corporation of Hopkinton, Mass. The CAP provides common access and login, common remote update, patch, and rollback and common administration, configuration, and remote service. The CAP may allow the user to save money while possibly having a better user experience.

For software developed for CAP, it is useful to have a standardized logging mechanism where different logging text messages may be represented using tokens (values) that are mapped one-for-one to each message. For example, a token value of seventeen may correspond to a message "Index out of bounds" while a token value of thirty corresponds to a message "Divide by zero error". Using tokens to represent messages has many advantages, including facilitating translation and being able to test the message tokens and perform particular actions based thereon. It may be much more straightforward to test if a message token value equals seventeen than it might be to examine a text string to determine if it says "index out of bounds", especially when considering all the possible variations (e.g., capitals, spaces, punctuation, hyphens or no hyphens, etc.). Furthermore, in the case of the CAP, standardization of the logging and using tokens allows combination and comparison of logging messages across different applications. Thus, there are many reasons to provide in the source code calls to logging routines using tokens rather than actual in-line text messages.

On the other hand, it may be easier for a developer to use in-line text messages in the source code when adding calls logging functions. For example, instead of needing to know or look up the token value for a divide by zero error, the developer may prefer to simply insert the text message directly in-line as a parameter to the logging function call. However, doing this negates the benefits of using tokens, discussed above.

Accordingly, it is desirable to provide a logging system that allows developers to insert logging text messages directly into calls to logging functions while still providing benefits associated with using tokens for calling log functions.

SUMMARY OF THE INVENTION

According to the system described herein, logging messages includes providing a logging subsystem that performs logging tasks, providing a log message database that contains log messages that are accessed according to a token value and providing calls to the logging subsystem, where a preprocessor modifies source code to replaces in-line text string parameters with tokens corresponding to the text string parameters. The in-line text string parameters may be log messages. The log message database may be coupled to the logging subsystem and the logging subsystem may access the log messages using the tokens. The preprocessor may determine if an in-line text message already exists in the log message database and, if not, may create a new entry for the in-line text message in the log message database. Logging messages may also include initializing the logging subsystem prior to use. Initializing may include reading configuration information that specifies operating parameters of the logging subsystem. The configuration information may be provided in a configuration file. The logging subsystem may be provided in a library. Calls to the logging subsystem may include providing a component id and a category id. The logging subsystem may log messages by matching the token with a message text string in a message log data element. The logging subsystem may log messages by first making a call back to an application that provides a message text string corresponding to a token for the message.

According further to the system described herein, preprocessing source code includes locating calls to a logging subsystem and replacing in-line message text parameters for the calls with tokens. Replacing an in-line message text parameter may include first determining if an equivalent message text entry exists in a log messages data element. Preprocessing source code may also include creating a new message text entry in the log messages data element in response to an equivalent message text entry not existing in the log messages data element.

According further to the system described herein, computer software, provided in a computer-readable medium, logs messages. The software includes executable code that performs logging tasks, a log message database that contains log messages that are accessed according to a value, and executable code that calls to the logging subsystem, where a preprocessor modifies source code to replaces in-line text string parameters with tokens corresponding to the text string parameters. The in-line text parameters may be log messages. The computer software may also include executable code that initializes the logging subsystem prior to use. Executable code that initializes the logging subsystem may read configuration information that specifies operating parameters of the logging subsystem. The configuration information may be provided in a configuration file. The computer software may also include executable code that logs messages by matching the token with a message text string in a message log data element.

BRIEF DESCRIPTION OF DRAWINGS

Embodiments of the system are described with reference to the several figures of the drawings, noted as follows.

DETAILED DESCRIPTION OF VARIOUS EMBODIMENTS

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

Figure 1:
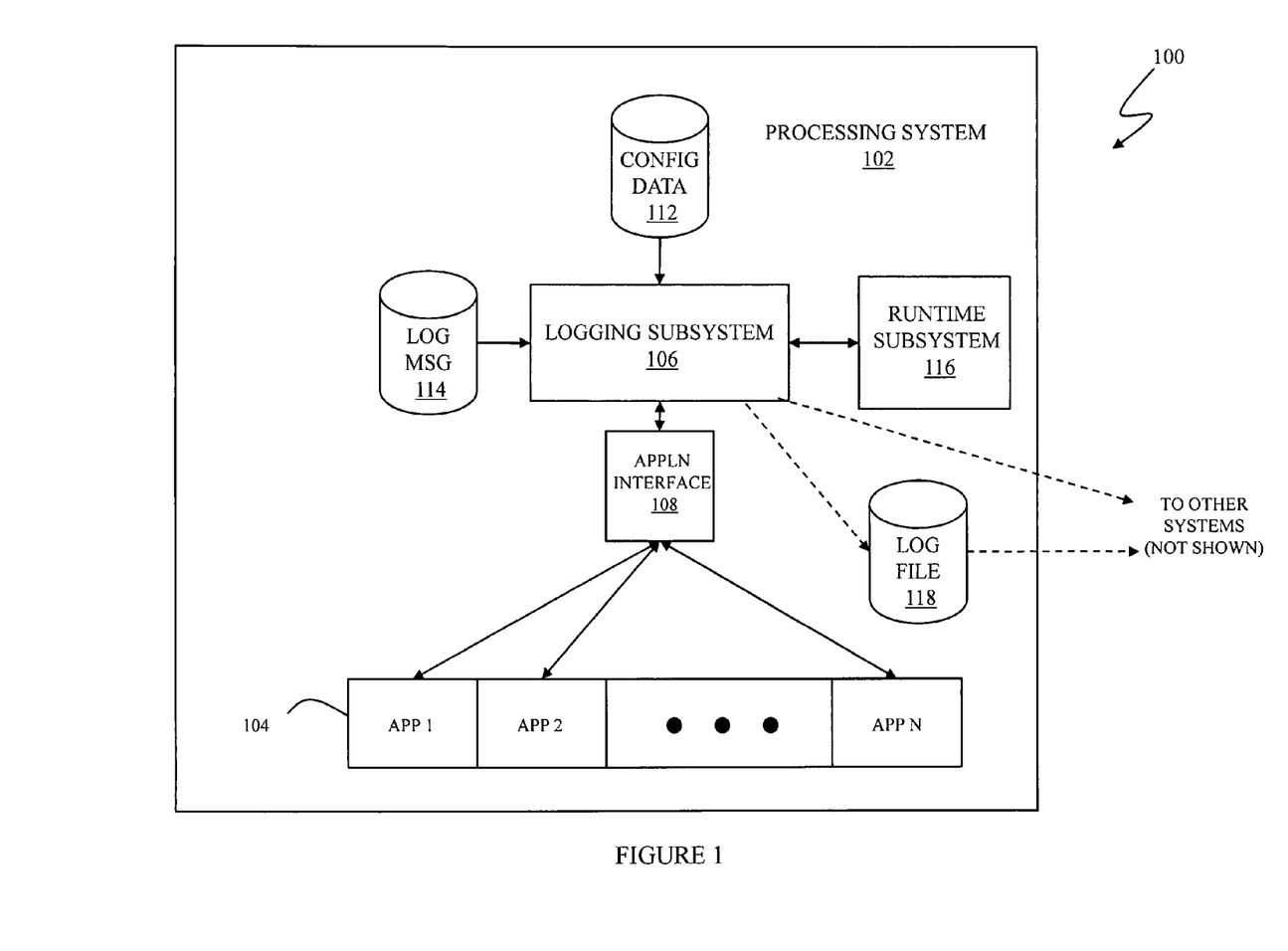
FIG. 1 is a schematic diagram showing a processor system having a plurality of applications and a logging subsystem according to an embodiment of the system described herein.

Referring to FIG. 1, a diagram 100 shows a processing system 102 having a plurality of applications 104 residing therein. The processing system 102 may represent any one or more computing devices, including processors, memory, etc., capable of hosting one or more applications. The processing system 102 may be in a single physical enclosure or in multiple physical enclosures provided in a single physical location and/or multiple physical locations having appropriate interconnections therebetween. In an embodiment herein, the processing system 102 may be implemented using a Common Appliance Platform (CAP) provided by EMC Corporation of Hopkinton, Mass.

The processing system 102 includes a logging subsystem 106 that handles logging error messages and other run-time process information for each of the applications 104 through an application interface 108. Thus, for the remainder of the discussion herein, references to calls made to the logging subsystem 106 may be understood to include calls through the application interface 108, where appropriate. The application interface 108 may include a number of API's used by the applications 104. The logging subsystem 106 obtains initial configuration information from a configuration data element 112 (data file) and obtains logging messages (i.e., specific text for messages) from a log message data element 114. The logging subsystem 106, the application interface 108, the configuration data element 112, and the log message data element 114 are all described in more detail elsewhere herein.

The processing system 102 may also include a runtime subsystem 116 that provides a runtime interface to the logging subsystem 106. The runtime subsystem 116 may include a command line interface and/or an appropriate GUI to allow a user to query and/or possibly modify value associated with the logging subsystem 106. For example, a user may use the runtime subsystem 116 to change the types/levels of events that are logged. The runtime subsystem 116 may use SQL queries to obtain data from the logging subsystem 106.

The logging subsystem 106 provides a collection of log messages that may be stored on the processing system 102 in the form of a log file 118 and/or provided to other systems (not shown) for storage and/or further on processing and/or displayed on a screen or other output device (e.g., printer). As explained in more detail elsewhere herein, each of the log messages may include text explaining the message as well as other useful information, such as process identification information and source code line number. In an embodiment herein, each log message includes a component identifier, a category identifier, a severity level, a text message, a name of a file containing the call to the logging subsystem 106, an identifier of the function from which the call was made, and a source code a line number. A component may refer to a subsystem or a module within a software application. A category may refer to a logical category across different components within a software application. The severity level may be defined for a particular application and, as discussed elsewhere herein, operation of the logging subsystem may be conditioned on severity level. Note, of course, that different information/data may be used for the log messages than that provided in the example herein.

In operation, the logging subsystem 106 may be accessed separately by each application through the application interface 108. The application interface 108 may be implemented as a set of APIs that may use a library that is linked to application code. An application developer may include calls for managing/using the logging subsystem 106 in source code. For example, a developer may have a test for when a denominator of an expression is (unexpectedly) equal to zero. The developer may then provide code that calls the logging subsystem 106 to log the attempt to divide by zero whenever the denominator is zero.

In some instances, the logging subsystem 106 may be automatically initialized for each application upon application startup. In other instances, an application may need to specifically initialize the logging subsystem 106 for the application. In such a case, the application may make a call through the application interface 108 to pass parameters for initialization such as the name of the application, and information relating to the components, categories, and log messages. In any case, some or all of the information needed for initialization may be provided by the configuration data 112 and/or may be set according to one or more defaults.

In some situations, the log messages 114 may be identified according to a token (value) that is used to index a table containing the text for a message. For example, a divide by zero error may correspond to a value of N. In such a case, a call to the logging subsystem 106 may pass the value of N to cause the message "Divide by Zero Error" to be logged. An advantage of using an index (token) to access messages is that different languages may be provided by changing the log messages 114 data without needing to change the application code. Other advantages include being able to condition particular actions based on requests to log specific messages and standardization across the applications 104.

It is possible to condition the logging of messages based on the severity of the condition that caused the call to the logging subsystem 106 to be made. The developer may hard code the severity level into the call. In an embodiment herein, the severity levels may be defined as TRACE, DEBUG, INFO, and ERROR, listed in order from least severe to most. A developer may wish to log all messages during development, but for production code that is provided to consumers, only messages having a level of ERROR are logged. This may be accomplished in a number of ways. For example, a preprocessor may simply conditionally remove or otherwise neutralize calls at or below a particular severity level. It is also possible to provide this information in the configuration data 112 (e.g., do not log messages having a severity level of DEBUG or below). It is also possible to change this at runtime either with an initialization call by the application to the logging subsystem 106 and/or by a call to change the configuration information that is made some time after the initialization.

The logging subsystem 106 may be provided in a library that is accessible to all of the applications 104 of the processing system 102. Alternatively, each of the applications 104 may provided its own logging subsystem 106 routines consistent with the discussion herein.

In some embodiments, it may be possible to provide a call back from the logging subsystem 106 to an application so that the application may provide particular text for messages. The logging subsystem 106 would provide a token to an application that may return a message text string to the logging subsystem 106. In still other instances, some or all of the particular log messages may vary according to the particular component, category, and/or severity corresponding to the call to the logging subsystem 106.

Figure 2:
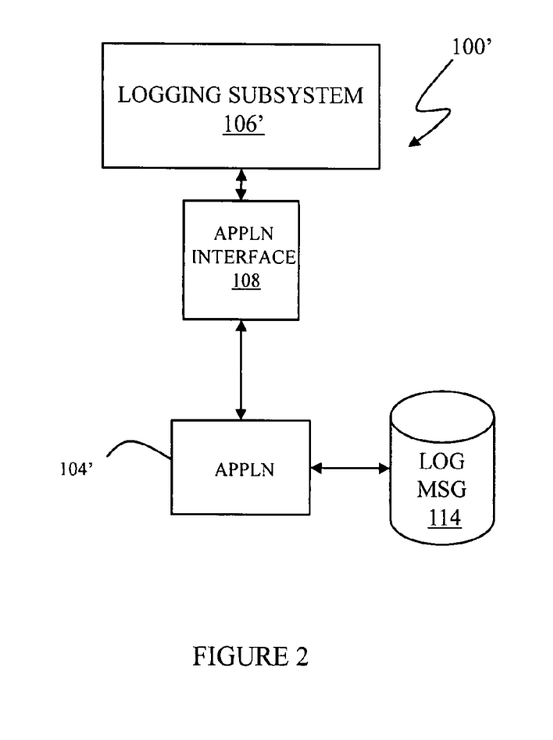
FIG. 2 is a schematic diagram showing a portion of a processor system with an application and a logging subsystem according to an alternative embodiment of the system described herein.

Referring to FIG. 2, an alternative embodiment 100' is illustrated where the application 104' may provide the message string to the logging subsystem 106'. In the embodiment illustrated by FIG. 2, the application 104' may pass a token to the logging subsystem 106', which then may make a call back to the application 104' to retrieve the string text for the message based on the value of the token. The application 104' may obtain the text string for the message from the log messages 114 and/or from some other source.

Figure 3:
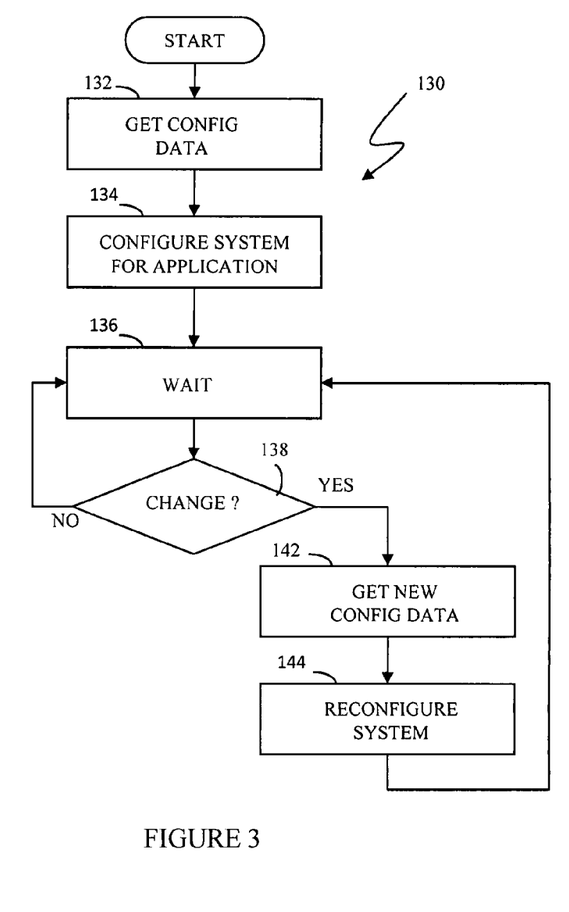
FIG. 3 is a flow chart illustrating steps performed in connection with initializing a logging subsystem according to an embodiment of the system described herein.

Referring to FIG. 3, a flow chart 130 illustrates steps performed in connection with an application initializing the logging subsystem 106 for use by the application. As discussed elsewhere herein, the application may explicitly call an initialization routine through the application interface 108 and/or the logging subsystem 106 may be automatically initialized for an application when the application starts. Processing begins at a first step 132 where the initial configuration information is obtained. The configuration information may be passed from a calling application, obtained from the configuration data 112, and/or obtained from any appropriate source. Following the step 132 is a step 134 where the logging subsystem 106 is configured for the application. The various parameters and values that may be configured are discussed in more detail elsewhere herein.

Following the step 134 is a step 136 where the system waits. In an embodiment herein, the logging subsystem 106 may poll periodically to determine if any configuration values/parameters have been changed (e.g., by the application, a user through the runtime subsystem 116, etc.). The wait at the step 136 may correspond to the polling cycle. Note that, alternatively, the cycle may be designed to run as quickly as possible, thus causing the amount of time between cycles to approach as close to zero as possible. In such a case, the step 136 may be eliminated altogether.

Following the step 136 is a test step 138 where it is determined if any of the configuration parameters have been changed. If not, control transfers back to the step 136 for another iteration. Otherwise, control transfers from the step 136 to a step 142 to obtain the new (changed) configuration data. Following the step 142 is a step 144 where the logging subsystem is reconfigured based on the new configuration data. Following the step 144, control transfers back to the step 136 for a next iteration.

Figure 4:
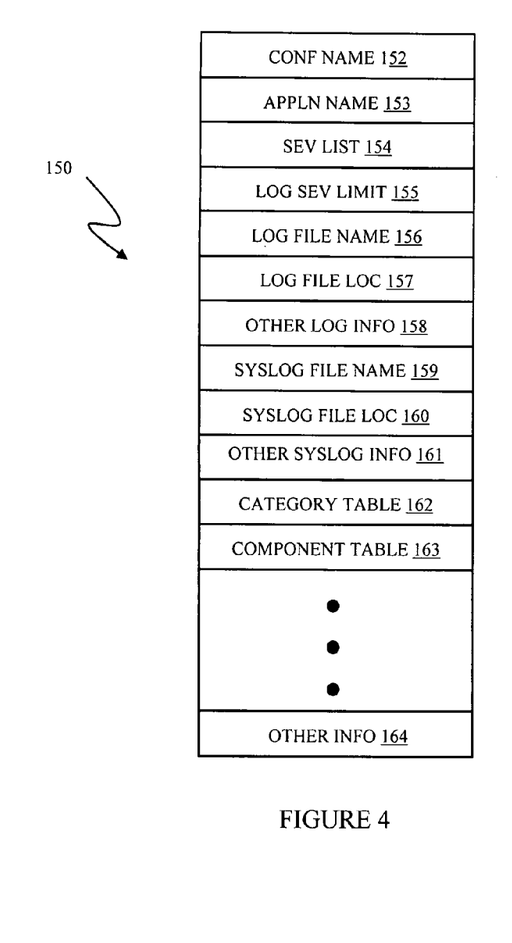
FIG. 4 is a schematic diagram illustrating configuration/operation information used by a logging subsystem according to an embodiment of the system described herein.

Referring to FIG. 4, a table 150 illustrates some of the data/parameters used by the logging subsystem 106 and, in some cases, initialized in connection with the processing illustrated by the flow chart 130 of FIG. 3, discussed above. Note, by the way, that although the table 150 is shown as a single unit in FIG. 4, it is possible to subdivide the data to provide any number of multiple units of data. Note also that the specific elements of the table 150 are illustrative only and that it is possible to implement the system described herein with different/modified elements for the table 150 than those described herein.

The table 150 includes a configuration name 152 that may be used to separately identify different configuration data sets. In an embodiment herein, a developer (or someone else) could provide different configuration sets for an application for different purposes. For example, there may be a first data set used for development where messages of any severity level are logged and a second data set used for production code where only messages of a certain severity level or above are logged. The configuration name element 152 may be used to separately identify the different sets and may be output in any appropriate fashion, such as being part of the information that is logged with each message, being accessible through the runtime subsystem 116, etc. The developer may select a particular logging configuration using any appropriate mechanism, such as a preprocessor parameter.

The table 150 may also include an application name element 153 that identifies the application, and a severity list element 154, the lists possible values for severity that may be associated with a message. The table 150 may also include a log severity limit element 155 that indicates a severity value below which messages are not logged, as discussed elsewhere herein. For example, if the severity values of TRACE, DEBUG, INFO and ERROR (discussed above) are used, a value of ERROR for the log severity limit element 155 would indicate that messages having a severity below ERROR are not to be logged. In an embodiment herein, no value specified for the log severity limit element 155 causes, by default, only messages of the highest severity level to be logged.

The table 150 may also include a log file name element 156 and a log file location element 157. As discussed elsewhere herein, it is possible to log messages to a data file that is part of the processor system 102 and/or external to the processor system 102. The log file name element 156 is the name of the data file and the log file location element 157 is the location of the file (e.g., a directory of the processor system 102, a url of an external system, etc.). In some embodiments, it may be possible to specify more than one log file name and location, in which case messages may be logged simultaneously to multiple destinations. The table 150 may also contain an other log info element 158 that includes other possible message log destination information, such as format information that specifies the format of the log file (e.g., xml/flat), a maximum size for the log file, and rotation information. Rotation information relates to the rotation policy and rotation parameters for log files to determine how many log files to keep, which log file(s) are removed once that number is reached (e.g., oldest log file, biggest log file, etc.), a possible alternative location for log files that are removed, etc.

The table 150 may also contain a syslog file name element 159, a syslog file location element 160, and an other syslog info field 161, which are similar to the log elements 156-158, discussed above. In an embodiment herein, a separate system-wide log is maintained that contains messages from the logging system 106 as well as messages from other sources (e.g., other ones of the applications 104), including possibly sources that are external to the processing system 102. Note, however, that it may not be possible for the logging subsystem 106 to provide the same level of control over the syslog file(s) as the log file(s). For example, the logging subsystem 106 may not be able to affect the rotation policy of the syslog files.

The table 150 also contains a category table element 162 that provides the categories used by the logging subsystem 106 and a component table element 163 that provides the components used by the logging subsystem 106. In an embodiment herein, the category table element 162 is a pointer to another table having entries where each entry corresponds to a category of the logging subsystem 106 and has a category id, category name, and possibly a Boolean field that indicates whether messages having the category may be logged. The category id is a numeric identifier (token) for the category while the category name is a text string. Similarly, the component table element 163 may be a pointer to another table having entries where each entry corresponds to a component of the logging subsystem 106 and has a component id, component name, and possibly a Boolean field that indicates whether messages having the component may be logged.

The table 150 also contains other data, represented by an other info data element 164. The other data may include any other appropriate configuration/operational information such as location information for the log messages 114, whether the messages use an application call back mechanism to get the message string (described elsewhere herein), and any other information that may be used in connection with configuration and/or operation of the logging system 106.

Figure 5:
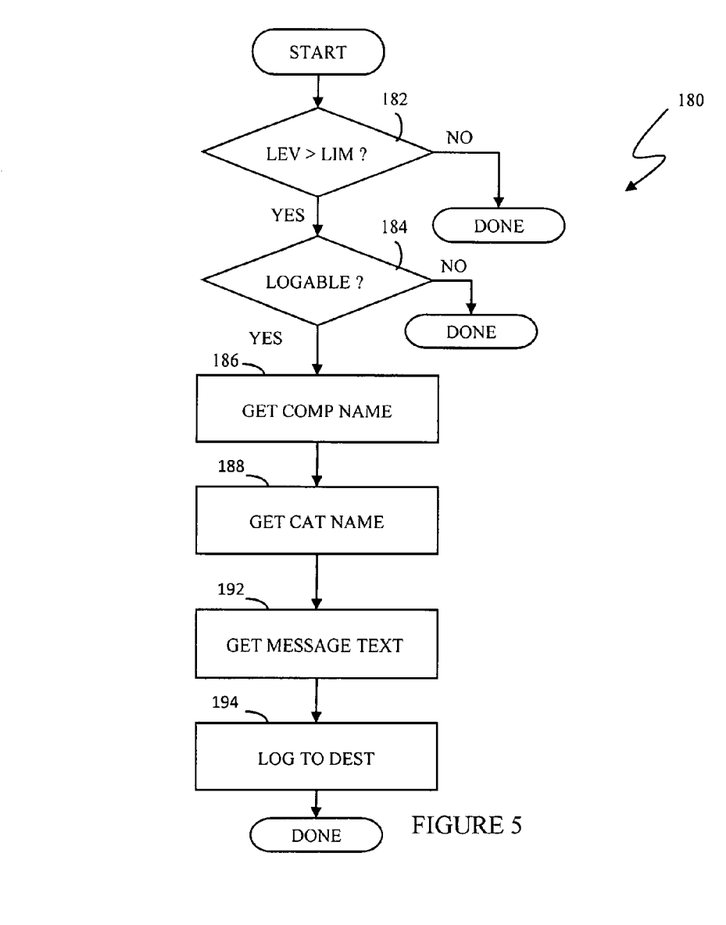
FIG. 5 is a flow chart illustrating steps performed in connection with operation of a logging subsystem according to an embodiment of the system described herein.

Referring to FIG. 5, a flow chart 180 illustrates steps performed by the logging subsystem 106 in connection with receiving a call from an application to log a message. As discussed elsewhere herein, each of the applications 104 may make calls to the logging subsystem 106 through the application interface 108. The calls may be interposed in the code by a developer to assist with the development process, to report errors, and/or for any other appropriate reason. In an embodiment herein, an application call to the logging subsystem 106 to log an event includes the component ID, the category ID, the severity level, and a message ID. The call may also include the name of the file that contains the call to the logging subsystem 106, the name of the function that contains the call, and the line number in the source code.

Processing for the flow chart 180 begins at a first test step 182 where it is determined if the severity level exceeds a limit for severity level established for logging messages. As discussed elsewhere herein, it is possible to establish a lower bound for severity level for logging messages. See, for example, the discussion above relating to the log severity limit 154 of the table 150. If it is determined at the test step 182 that the severity level passed by the application to the logging subsystem 106 does not exceed the limit, then processing is complete. Otherwise, control passes from the test step 182 to a test step 184 where it is determined if the component ID and/or the category ID correspond to a component and a category that is logable. As discussed elsewhere herein, it is possible to associate a Boolean value indicating the logability of each component and category. In an embodiment herein, no log message is generated if either the component or the category are not logable. However, it is also possible to not generate a log message only if both the component and category are not logable.

If it is determined at the test step 184 that the message is not logable, then processing is complete. Otherwise, control transfers from the test step 184 to a step 186 where the string text of the component name is retrieved (using, for example, the component ID passed to the call to the logging subsystem 106 and the component table, discussed elsewhere herein). Following the step 186 is a step 188 where the string text of the category name is retrieved in a manner similar to retrieving the component name. Following the step 188 is a step 192 where the string text for the message is retrieved, as discussed in more detail elsewhere herein. Following the step 192 is a step 194 where the message is logged (written) to one or more destinations, as discussed elsewhere herein. The logged data may include the component string, the category string, the severity, and the message string. The logged data may also include the file name and line number corresponding to the file containing the source code as well as the name of the function. The logged data may also include a timestamp, a process id, a thread id, and a relevant memory location (i.e. location of memory being accessed or memory location of the call). Following the step 194, processing is complete.

Figure 6:
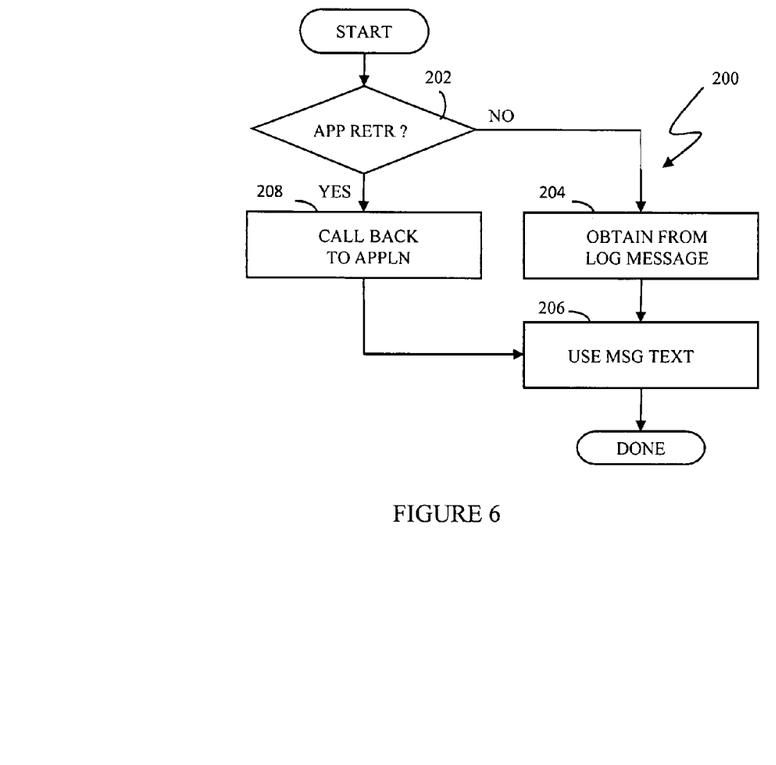
FIG. 6 is a flow chart illustrating steps performed in connection with a logging subsystem performing a call back to an application to obtain a log message string according to an embodiment of the system described herein.

Referring to FIG. 6, a flow chart 200 illustrates in more detail the logging subsystem 106 obtaining a message text string at the step 192 in the flow chart 180 of FIG. 5. Processing begins at a first test step 202 where it is determined if the application is to retrieve the message text string. As discussed in more detail elsewhere herein, it is possible to have the logging subsystem 106 obtain the text message string or to have the application retrieve the text message string in response to a call back from the logging subsystem 106 to the application. The test at the step 202 distinguishes between the two modes and determines if the application is to provide the message text string. If not, then control transfers from the test step 202 to a step 204 where the message text string is obtained from the log message data element 114. As discussed elsewhere, message text strings may be stored, and accessed, using an index in the form of a message identifier or token.

Following the step 204 is a step 206 where the message text string, obtained at the step 204, is provided to form the entire log message. Following the step 206, processing is complete. If it is determined at the step 202 that the application is to provide the message text string, then control transfers from the test step 202 to a step 208 where the logging subsystem 106 performs a call back to the application to have the application obtain the message text string (e.g., from the log message data element 114). Following the step 208, control transfers to the step 206, discussed above, where the message text string, obtained at the step 208, is provided to form the entire log message. Following the step 206, processing is complete.

As mentioned elsewhere herein, in some cases it is useful for a developer to be able to insert logging calls with in-line text rather than having to use message numbers or tokens. Thus, a developer may provide a call with a message string that indicates whatever condition the developer wants. However, in other instances, it may be more useful to use message numbers or tokens to identify the various logging messages because doing so facilitates translation and standardization and allows for more straight-forward coding when it is desirable to condition certain actions on logging particular messages or particular types of messages.

The system described herein addresses this by providing a pre-processor that scans the source code for calls to the logging subsystem 106 having in-line text strings. This may be facilitated by the developer by inserting particular tags or identifiers to indicate the presence of in-line text strings. The preprocessor then creates a new message token (and corresponding text message in the log message data element 114) and then converts the in-line text to a message token. After the pre-processor has run, the call to the logging subsystem 106 contains the token rather than the in-line text. The following describes this in more detail.

Figure 7:
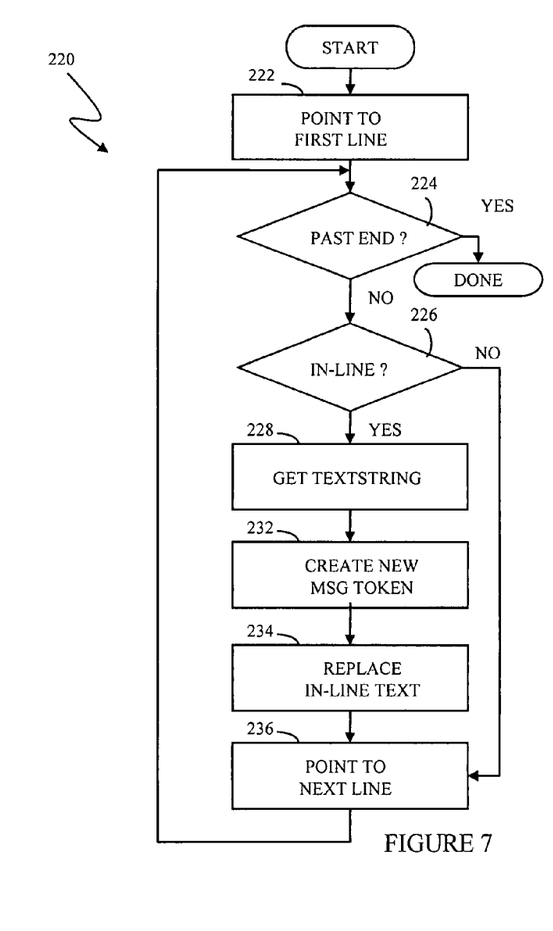
FIG. 7 is a flow chart illustrating steps performed in connection with preprocessing source code for operation with a logging subsystem according to an embodiment of the system described herein.

Referring to FIG. 7, a flow chart 220 illustrates steps performed in connection with a preprocessor converting source code calls to the logging subsystem 106 containing in-line text. Processing begins at a first step 222 where a pointer that iterates through the lines of source code is initialized to point to the first line of source code. Following the step 222 is a test step 224 where it is determined if the iteration pointer points past the end of the source code. If so, then processing is complete. Otherwise, control transfers from the test step 224 to a test step 226 where it is determined if the source code line pointed to by the iteration pointer points to a line of source code containing a call to the logging subsystem 106 with an in-line text message. The test at the step 226 may examine the call parameters to detect the in-line text message (e.g., look for quotes), the developer may place a particular tag in the line of code (or one or more lines before or after), or may use any other appropriate means for detection.

If it is determined at the test step 226 that the line contains a call to the logging subsystem 106 and that the call includes an in-line text string, then control transfers from the test step 226 to a step 228 where the text string is obtained (e.g., text between quotes). Following the step 228 is a step 232 where a new message token is created for the string. Creating a new message token at the step 232 is discussed in more detail elsewhere herein. Following the step 232 is a step 234 where the in-line text string is replaced with the token. Following the step 234 is a step 236 where the pointer that iterates through the lines of the source code is incremented. Note that the step 236 is also reached from the test step 236 if it is determined that the line of source code being processed does not contain a call to the logging subsystem 106 with an in-line text string. Following the step 236, control transfers back to the step 224 for another iteration.

Figure 8:
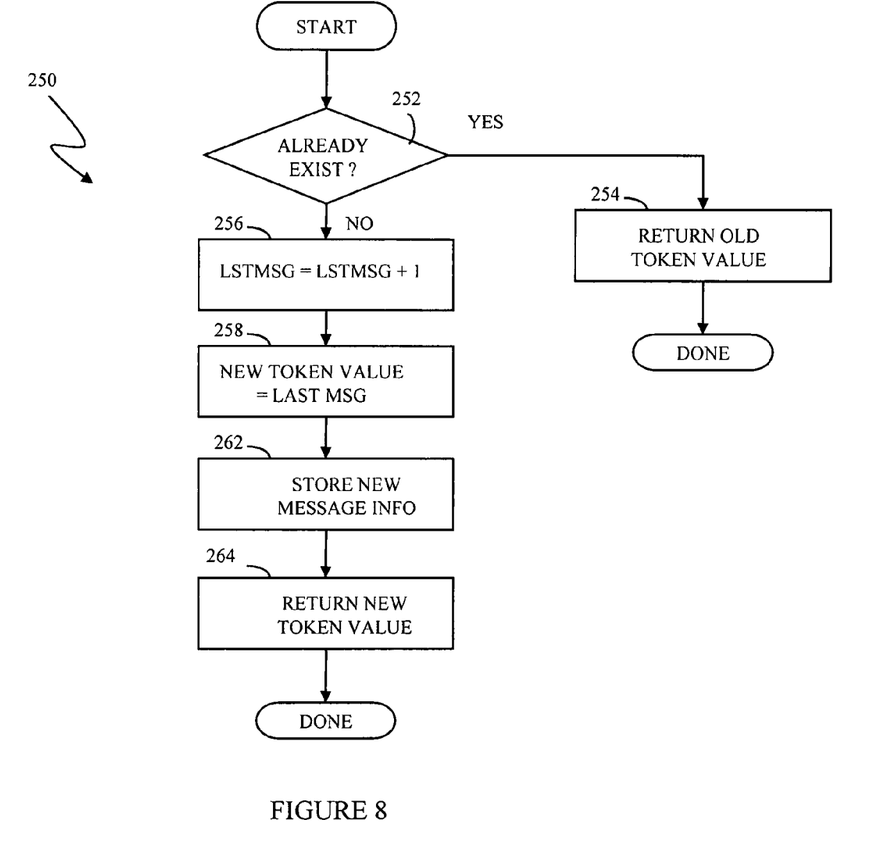
FIG. 8 is a flow chart illustrating steps performed in connection with adding log messages for a logging subsystem according to an embodiment of the system described herein.

Referring to FIG. 8, a flow chart 250 illustrates in more detail steps performed in connection with converting a text string to a message token. Processing begins at a first step 252 where it is determined if the text string already exists in the table of message text strings and tokens. Note that if a particular message string already exists then it is probably not desirable to create another identical message text string. If it is determined at the test step 252 that the message text string already exists, then control transfers from the step 252 to a step 254 where the old (already existing) token for the text string is returned to the calling process. Following the step 254, processing is complete.

If it is determined at the step 252 that the message text string does not already exist, then control transfers from the test step 252 to a step 256 to increment a variable LSTMSG, which points to the last message in a message table in the log message data element 114. Following the step 256 is a step 258 where the new token value (that is to be returned) is set equal to LSTMSG. Following the step 258 is a step 262 where the information for the new log message is stored in the log message data element 114. In an embodiment herein, the log message data element 114 may contain a table of messages where each entry includes the message token and the message string, but of course, other appropriate formats may be used. Following the step 262 is a step 264 where the new token value is returned to the calling process. Following the step 264, processing is complete.

In some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system also includes computer software, in a computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method of logging messages, comprising:
providing a logging subsystem that performs logging tasks using at least one processor;
providing a log message database that contains log messages that are accessed according to a token value; and
providing calls to the logging subsystem, wherein a preprocessor scans source code, locates in-line text string parameters of the source code that indicate at least one call to the logging subsystem, and modifies the source code to replace the in-line text string parameters with tokens corresponding to the text string parameters.

2. A method, according to claim 1, wherein the in-line text string parameters are log messages.

3. A method, according to claim 1, wherein the log message database is coupled to the logging subsystem and wherein the logging subsystem accesses the log messages using the tokens.

4. A method, according to claim 1, wherein the preprocessor determines if an in-line text message already exists in the log message database and, if not, creates a new entry for the in-line text message in the log message database.

5. A method, according to claim 1, further comprising:
initializing the logging subsystem prior to use.

6. A method, according to claim 5, wherein initializing includes reading configuration information that specifies operating parameters of the logging subsystem.

7. A method, according to claim 6, wherein the configuration information is provided in a configuration file.

8. A method, according to claim 1, wherein the logging subsystem is provided in a library.

9. A method, according to claim 1, wherein calls to the logging subsystem include providing a component id and a category id.

10. A method, according to claim 1, wherein the logging subsystem logs messages by matching the token with a message text string in a message log data element.

11. A method, according to claim 1, wherein the logging subsystem logs messages by first making a call back to an application that provides a message text string corresponding to a token for the message.

12. A method of preprocessing source code using at least one processor, comprising:
scanning the source code using a preprocessor;
locating, using the preprocessor, in-line message text parameters of the source code that indicate calls to a logging subsystem; and
replacing, using the preprocessor, the in-line message text parameters in the source code with tokens corresponding to the in-line message text parameters.

13. A method, according to claim 12, wherein, for at least one of the in-line message text parameters, replacing the at least one in-line message text parameter includes first determining if a first message text entry already exists in a log messages data element that logs a call to the logging subsystem corresponding to the at least one in-line message text parameter of the source code.

14. A method, according to claim 13, further comprising:
creating a new message text entry in the log messages data element in response to the first message text entry not existing in the log messages data element.

15. Computer software, provided in a non-transitory computer-readable medium, that logs messages, the software comprising:
executable code that performs logging tasks;
executable code that provides a log message database that contains log messages that are accessed according to a value; and
executable code that scans source code, locates in-line text string parameters of the source code that indicate at least one call to the logging subsystem, and modifies the source code to replace the in-line text string parameters with tokens corresponding to the text string parameters.

16. Computer software, according to claim 15, wherein the in-line text parameters are log messages.

17. Computer software, according to claim 15, further comprising:
executable code that initializes the logging subsystem prior to use.

18. Computer software, according to claim 17, wherein executable code that initializes the logging subsystem reads configuration information that specifies operating parameters of the logging subsystem.

19. Computer software, according to claim 18, wherein the configuration information is provided in a configuration file.

20. Computer software, according to claim 15, further comprising:
executable code that logs at least one message by matching at least one of the tokens with a message text string in a message log data element.

\* \* \* \* \*